(12) United States Patent
Driemeyer et al.

(10) Patent No.: US 7,173,617 B2
(45) Date of Patent: Feb. 6, 2007

(54) SYSTEM AND METHOD FOR GENERATING AND USING SYSTEMS OF COOPERATING AND ENCAPSULATED SHADERS AND SHADER DAGS FOR USE IN A COMPUTER GRAPHICS SYSTEM

(75) Inventors: Thomas Driemeyer, Berlin (DE); Rolf Herken, Berlin (DE)

(73) Assignee: Mental Images GmbH, Berlin (DE)

( * ) Notice: Subject to any disclaimer, the term of this patent is extended or adjusted under 35 U.S.C. 154(b) by 115 days.

(21) Appl. No.: 10/462,500

(22) Filed: Jun. 16, 2003

(65) Prior Publication Data

US 2003/0222870 A1 Dec. 4, 2003

Related U.S. Application Data

(60) Division of application No. 10/462,500, filed on Aug. 30, 2002, Division of application No. 10/232,069, filed on Jul. 1, 1998, Continuation-in-part of application No. 09/108,596, filed on Jul. 2, 1997.

(51) Int. Cl.
*G06T 15/00* (2006.01)

(52) U.S. Cl. ........................ 345/426; 345/440; 345/619

(58) Field of Classification Search ................ 345/419, 345/420, 426, 619, 620, 625, 628, 440, 441
See application file for complete search history.

(56) References Cited

U.S. PATENT DOCUMENTS

| 6,191,787 B1 * | 2/2001 | Lu et al. ...................... 345/418 |
| 6,215,495 B1 * | 4/2001 | Grantham et al. .......... 345/419 |
| 6,478,735 B1 * | 11/2002 | Pope et al. ................. 600/300 |
| 6,578,197 B1 * | 6/2003 | Peercy et al. ............... 717/143 |
| 6,606,092 B2 * | 8/2003 | Driemeyer et al. ......... 345/426 |

FOREIGN PATENT DOCUMENTS

| EP | 0 528 631 A | 2/1993 |
| WO | WO 95 06298 A | 3/1995 |

OTHER PUBLICATIONS

T. Whitted et al., "A Software Testbed for the Development of 3D Raster Graphics Systems," ACM Trans. Graphics, vol. 1, No. 1, Jan. 1982, pp. 43-58.
R. Cook, "Shade Trees," Proc. SIGGRAPH 1984, in: Computer Graphics, vol. 18, No. 3, Jul. 1984, pp. 223-231.
K. Perlin, "An Image Synthesizer," Proc. SIGGRAPH 1985, in: Computer Graphics, vol. 19, No. 3, Jul. 1985, pp. 287-296.
P. K. Egbert, et al., Application Graphics Modeling Support Through Object Orientation, Computer, vol. 25, No. 10, Oct. 1, 1992, pp. 84-91.
J. Doellner, et al., "Object-oriented 3D Modelling, Animation and Interaction," J. Visualization and Computer Animation, Jan.-Mar. 1997, vol. 18, No. 1, pp. 33-64.
R. Rost, et al., PEX: A Network-Transparent 3D Graphics System, IEEE Computer Graphics and Applications, vol. 9, No. 4, Jul. 1989, pp. 14-26.
Pixar, "The Renderman Interface," Version 3.1, Sep. 1989, section 12 "Shader Execution Environment," pp. 109-114.

* cited by examiner

*Primary Examiner*—Phu K. Nguyen
(74) *Attorney, Agent, or Firm*—Jacobs & Kim LLP; David A. Jacobs

(57) ABSTRACT

A computer graphics system is described in which a new type of entity, referred to as a "phenomenon," can be created, instantiated and used in rendering an image of a scene. A phenomenon is an encapsulated shader DAG comprising one or more nodes each comprising a shader, or an encapsulated set of such DAGs which are interconnected so as to cooperate, which are instantiated and attached to entities in the scene which are created during the scene definition process to define diverse types of features of a scene, including color and textural features of surfaces of objects in the scene, characteristics of volumes and geometries in the scene, features of light sources illuminating the scene, features of simulated cameras will be simulated during rendering, and numerous other features which are useful in rendering. Phenomena selected for use by an operator in connection with a scene may be predefined, or they may be constructed from base shader nodes by an operator using a phenomenon creator. The phenomenon creator ensures that phenomena are constructed so that the shaders in the DAG or cooperating DAGs can correctly cooperate during rendering of an image of the scene. Prior to being attached to a scene, a phenomenon is instantiated by providing values, or functions which are used to define the values, for each of the phenomenon's parameters, using a phenomenon editor. The phenomenon editor allows the operator to view the effects produced by various settings for the parameter values which are selected. During scene image generation, a scene image generator operates in a series of phases, including a including a preprocessing phase, a rendering phase and a post-processing phase. During a pre-processing phase, the scene image generator can perform pre-processing operations, such as shadow and photon mapping, multiple inheritance resolution, and the like. The scene image generator may perform pre-processing operations if, for example, a phenomenon attached to the scene includes a geometry shader to generate geometry defined thereby for the scene. During the rendering phase, the scene image generator renders the image. During the post-processing phase, the scene image generator may perform post-processing operations if, for example, a phenomenon attached to the scene includes a shader that defines post-processing operations.

38 Claims, 8 Drawing Sheets

PHENOMENON CREATOR WINDOW 40

Wood Material Phenomenon 60

Resulting Dialog for Wood

Dialog Canvas for Wood

SYSTEM AND METHOD FOR GENERATING AND USING SYSTEMS OF COOPERATING AND ENCAPSULATED SHADERS AND SHADER DAGS FOR USE IN A COMPUTER GRAPHICS SYSTEM

This is a Divisional of co-pending application Ser. No. 10/232,069 filed on Aug. 30, 2002, which is a Divisional of U.S. patent application Ser. No. 09/108,596, filed Jul. 1, 1998 (now U.S. Pat. No. 6,496,190, issued Dec. 17, 2002), which is a Continuation-In-Part of U.S. Provisional Patent Application Serial No. 60/051,507, filed Jul. 2, 1997.

INCORPORATION BY REFERENCE

"Mental Ray Phenomena," an unpublished paper by Thomas Driemeyer and Rolf Herken, attached hereto as an appendix, incorporated by reference.

FIELD OF THE INVENTION

The invention relates generally to the field of computer graphics, computer-aided design and the like, and more particularly to systems and methods for generating shader systems and using the shader systems so generated in rendering an image of a scene. The invention in particular provides a new type of component useful in a computer graphics system, identified herein as a "phenomenon," which comprises a system including a packaged and encapsulated shader DAG ("directed acyclic graph") or set of cooperating shader DAGs, each of which can include one or more shaders, which is generated and encapsulated to assist in defining at least a portion of a scene, in a manner which will ensure that the shaders can correctly cooperate during rendering.

BACKGROUND OF THE INVENTION

In computer graphics, computer-aided geometric design and the like, an artist, draftsman or the like (generally referred to herein as an "operator") attempts to generate a three-dimensional representation of objects in a scene, as maintained by a computer, and thereafter render respective two-dimensional images of the objects in the scene from one or more orientations. In the first, representation generation phase, conventionally, computer graphics systems generate a three-dimensional representation from, for example, various two-dimensional line drawings comprising contours and/or cross-sections of the objects in the scene and by applying a number of operations to such lines which will result in two-dimensional surfaces in three-dimensional space, and subsequent modification of parameters and control points of such surfaces to correct or otherwise modify the shape of the resulting representation of the object. During this process, the operator also defines various properties of the surfaces of the objects, the structure and characteristics of light sources which illuminate the scene, and the structure and characteristics of one or more simulated cameras which generate the images. After the structure and characteristics of the scene, light source(s) and camera(s) have been defined, in the second phase, an operator enables the computer to render an image of the scene from a particular viewing direction.

The objects in the scene, light source(s) and camera(s) are defined, in the first, scene definition, phase, by respective multiple-dimensional mathematical representations, including at least the three spatial dimensions, and possibly one time dimension. The mathematical representations are typically stored in a tree-structured data structure. The properties of the surfaces of the objects, in turn, are defined by "shade trees," each of which includes one or more shaders which, during the second, scene rendering, phase, enables the computer to render the respective surfaces, essentially providing color values representative of colors of the respective surfaces. The shaders of a shade tree are generated by an operator, or are provided a priori by a computer graphics system, in a high-level language such as C or C++, which together enable the computer to render an image of a respective surface in the second, scene rendering, phase.

A number of problems arise from the generation and use of shaders and shade trees as currently provided in computer graphics arrangements. First, shaders generally cannot cooperate with each other unless they are programmed to do so. Typically, input values provided to shaders are constant values, which limits the shaders' flexibility and ability to render features in an interesting and life-like manner. In addition, it is generally difficult to set up systems of cooperating shaders which can get their input values from a common source.

SUMMARY OF THE INVENTION

The invention provides a new and improved computer graphic system and method that provides for enhanced cooperation among shaders by facilitating generation of packaged and encapsulated shader DAGs, each of which can include one or more shaders, generated in a manner so as to ensure that the shaders in the shader DAGs can correctly cooperate during rendering.

In brief summary, a computer graphics system is provided in which a new type of entity, referred to as a "phenomenon," can be created, instantiated and used in rendering an image of a scene. A phenomenon is an encapsulated shader DAG comprising one or more nodes each comprising a shader, or an encapsulated set of such DAGs which are interconnected so as to cooperate, which are instantiated and attached to entities in the scene which are created during the scene definition process to define diverse types of features of a scene, including color and textural features of surfaces of objects in the scene, characteristics of volumes and geometries in the scene, features of light sources illuminating the scene, features of simulated cameras which will be simulated during rendering, and numerous other features which are useful in rendering.

Phenomena selected for use by an operator in connection with a scene may be predefined, or they may be constructed from base shader nodes by an operator using a phenomenon creator. The phenomenon creator ensures that phenomena are constructed so that the shaders in the DAG or cooperating DAGs can correctly cooperate during rendering of an image of the scene.

Prior to being attached to a scene, a phenomenon is instantiated by providing values, or functions which are used to define the values, for each of the phenomenon's parameters, using a phenomenon editor.

After a representation of a scene has been defined and phenomena attached, a scene image generator can generate an image of the scene. In that operation, the scene image generator operates in a series of phases, including a pre-processing phase, a rendering phase and a post-processing phase. During a pre-processing phase, the scene image generator can perform pre-processing operations, such as shadow and photon mapping, multiple inheritance resolution, and the like. The scene image generator may perform pre-processing operations if, for example, a phenomenon attached to the scene includes a geometry shader to generate geometry defined thereby for the scene. During the rendering phase, the scene image generator renders the image. During the post-processing phase, the scene image generator may perform post-processing operations if, for example, a phenomenon attached to the scene includes a shader that defines post-processing operations, such as depth of field or motion blur calculations which are dependent on velocity and depth information stored in connection with each pixel value in the rendered image.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN
ILLUSTRATIVE EMBODIMENT

Figure 1:
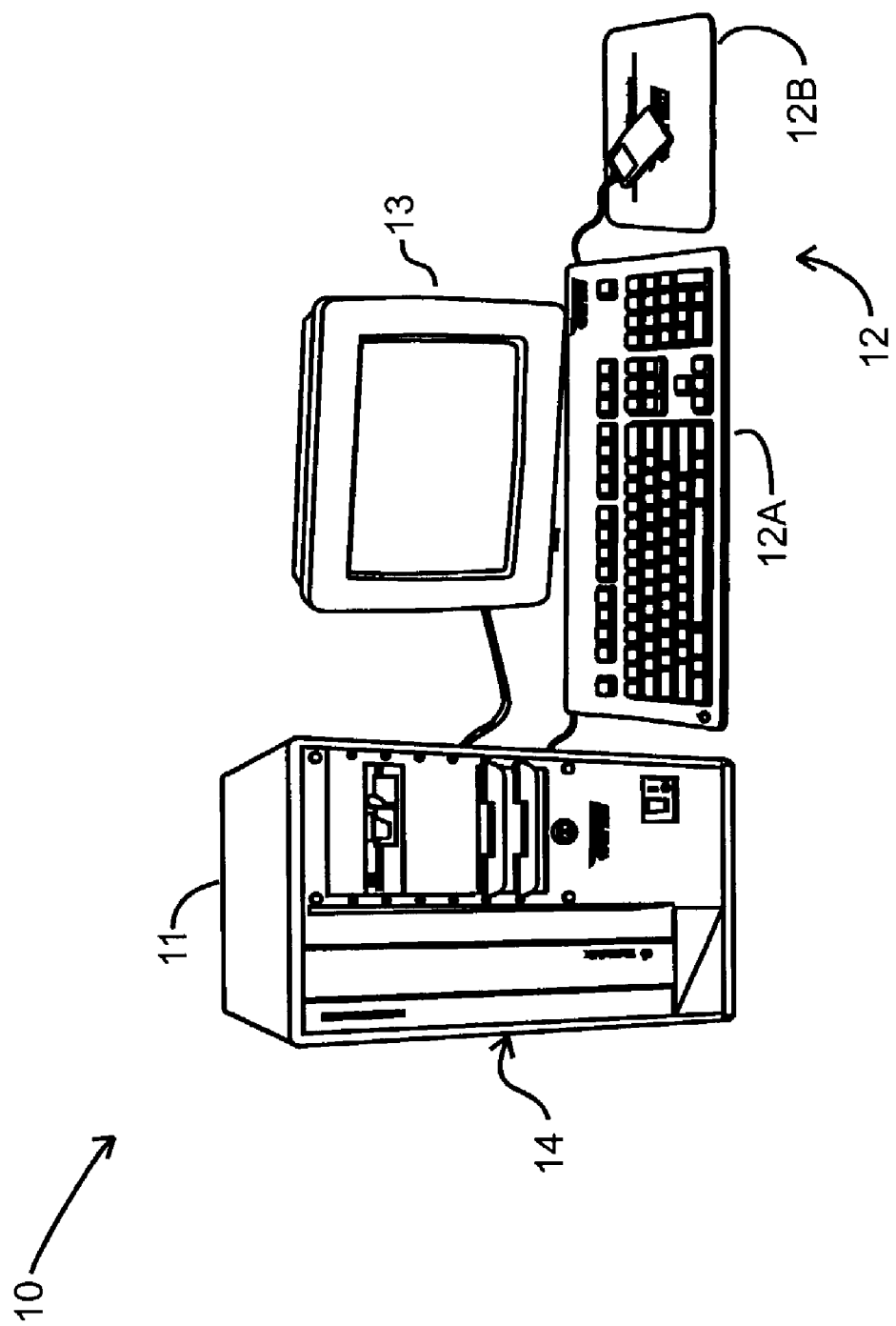
FIG. 1 depicts a computer graphics system that provides for enhanced cooperation among shaders by facilitating generation of packaged and encapsulated shader DAGs, each of which can include one or more shaders, which shader DAGs are generated in a manner so as to ensure that the shaders in the shader DAG can correctly cooperate during rendering, constructed in accordance with the invention.

FIG. 1 attached hereto depicts elements comprising an computer graphics system 10 constructed in accordance with the invention. The computer graphics system 10 provides for enhanced cooperation among shaders by facilitating generation of new computer graphic components, referred to herein as "phenomenon" (in the singular) or "phenomena" (in the plural), which are used to define features of a scene for use in rendering. A phenomenon is a packaged and encapsulated system comprising one or more shaders, which are organized and interconnected in the form of one or more directed acyclic graphs ("DAGs"), with each DAG including one or more shaders. The phenomena generated by the computer graphics system 10 are generated in such a manner as to ensure that the shader or shaders in each shader DAG can correctly cooperate during rendering, to facilitate the rendering of realistic or complex visual effects. In addition, for phenomena which comprise multiple cooperating shader DAGs, the computer graphics system 10 generates the phenomena such that the shaders in all of the shader DAGs can correctly cooperate during the rendering, to facilitate the rendering of progressively realistic or complex visual effects.

With reference to FIG. 1, the computer graphics system 10 in one embodiment includes a computer including a processor module 11 and operator interface elements comprising operator input components such as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, processor, memory and mass storage devices such as disk and/or tape storage elements (not separately shown) which perform processing and storage operations in connection with digital data provided thereto. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 may include one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As noted above, computer graphics system 10 provides for enhanced cooperation among shaders by facilitating generation of phenomena comprising packaged and encapsulated shader DAGs or cooperating shader DAGs, with each shader DAG comprising at least one shader, which define features of a three-dimensional scene. Phenomena can be used to define diverse types of features of a scene, including color and textural features of surfaces of objects in the scene, characteristics of volumes and geometries in the scene, features of light sources illuminating the scene, features of simulated cameras or other image recording devices which will be simulated during rendering, and numerous other features which are useful in rendering as will be apparent from the following description. The phenomena are constructed so as to ensure that the shaders in the DAG or cooperating DAGs can correctly cooperate during rendering of an image of the scene.

Figure 2:
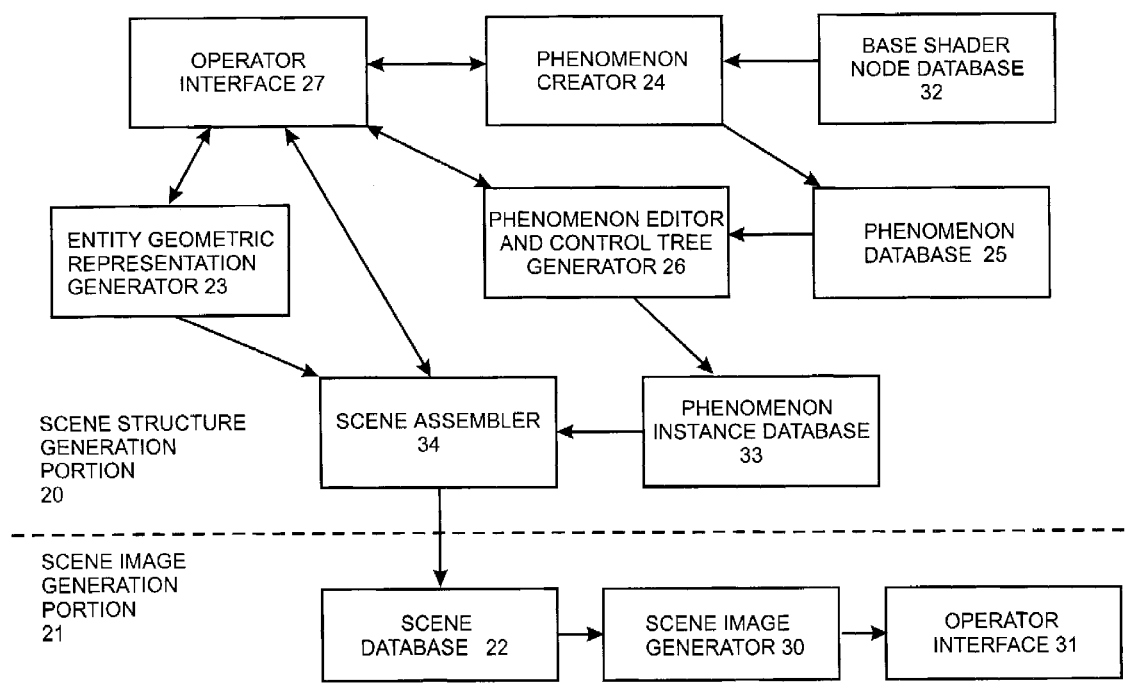
FIG. 2 is a functional block diagram of the computer graphics system depicted in FIG. 1.

FIG. 2 depicts a functional block diagram of the computer graphics system 10 used in one embodiment of the invention. As depicted in FIG. 2, the computer graphics system 10 includes two general portions, including a scene structure generation portion 20 and an scene image generation portion 21. The scene structure generation portion 20 is used by an artist, draftsman or the like (generally, an "operator") during a scene entity generation phase to generate a representation of various elements which will be used by the scene image generation portion 21 in rendering an image of the scene, which may include, for example, the objects in the scene and their surface characteristics, the structure and characteristics of the light source or sources illuminating the scene, and the structure and characteristics of a particular device, such as a camera, which will be simulated in generating the image when the image is rendered. The representation generated by the scene structure generation portion 20 is in the form of a mathematical representation, which is stored in the scene object database 22. The mathematical representation is evaluated by the image rendering portion 21 for display to the operator. The scene structure generation portion 20 and the scene image generation portion 21 may reside on and form part of the same computer, in which case the scene object database 22 may also reside on that same computer or alternatively on a server for which the computer 20 is a client. Alternatively, the portions 20 and 21 may reside on and form parts of different computers, in which case the scene object database 22 may reside on either computer or a server for both computers.

More particularly, the scene structure generation portion 20 is used by the operator to generate a mathematical representation defining comprising the geometric structures of the objects in the scene, the locations and geometric characteristics of light sources illuminating the scene, and the locations, geometric and optical characteristics of the cameras to be simulated in generating the images that are to be rendered. The mathematical representation preferably defines the three spatial dimensions, and thus identifies the locations of the object in the scene and the features of the objects. The objects may be defined in terms of their one-, two- or three-dimensional features, including straight or curved lines embedded in a three-dimensional space, two-dimensional surfaces embedded in a three-dimensional space, one or more bounded and/or closed three-dimensional surfaces, or any combination thereof. In addition, the mathematical representations may also define a temporal dimension, which may be particularly useful in connection with computer animation, in which the objects and their respective features are considered to move as a function of time.

In addition to the mathematical representation of the geometrical structure of the object(s) in the scene to be rendered, the mathematical representation further defines the one or more light sources which illuminate the scene and a camera. The mathematical representation of a light source particularly defines the location and/or the direction of the light source relative to the scene and the structural characteristics of the light source, including whether the light source is a point source, a straight or curved line, a flat or curved surface or the like. The mathematical representation of the camera particularly defines the conventional camera parameters, including the lens or lenses, focal length, orientation of the image plane, and so forth.

The scene structure generation portion 20 also facilitates generation of phenomena, which will be described in detail below, and association of the phenomena to respective elements of the scene. Phenomena generally define other information that is required for the completion of the definition of the scene which will be used in rendering. This information includes, but is not limited to, characteristics of the colors, textures, and so forth, of the surfaces of the geometrical entities defined by the scene structure generation portion 20. A phenomenon may include mathematical representations or other objects which, when evaluated during the rendering operation, will enable the computer generating the rendered image to display the respective surfaces in the desired manner. The scene structure generation portion 20, under control of the operator, effectively associates the phenomena to the mathematical representations for the respective elements (that is, objects, surfaces, volumes and the like) with which they are to be used, effectively "attaching" the phenomena to the respective elements.

After the mathematical representations have been generated by the scene structure generation portion 20 and stored in the scene representation database 22, the scene image generation portion 21 is used by an operator during a rendering phase to generate an image of the scene on, for example, the video display unit 13 (FIG. 1).

The scene structure generation portion 20 includes several elements, including an entity geometrical representation generator 23, a phenomenon creator 24, a phenomenon database 25, a phenomenon editor 26, a base shader node database 32, a phenomenon instance database 33 and a scene assembler 34, all of which operate under control of operator input information entered through an operator interface 27. The operator interface 27 may generally include the operator input devices 12 and the video display unit 13 of computer graphics system 10 as described above in connection with FIG. 1. The entity geometrical representation generator 23, under control of operator input from the operator interface 27, facilitates the generation of the mathematical representation of the objects in the scene and the light source(s) and camera as described above. The phenomenon creator 24 provides a mechanism whereby the operator, using the operator interface 27 and base shader nodes from the base shader node database 32, can generate phenomena which can be used in connection with the scene or otherwise (as will be described below). After a phenomenon is generated by the phenomenon creator 24, it (that is, the phenomenon) will be stored in the phenomenon database 25. After a phenomenon has been stored in the phenomenon database 25, an instance of the phenomenon can be created by the phenomenon editor 26. In that operation, the operator will use the phenomenon editor 26 to provide values for the phenomenon's various parameters (if any). For example, if the phenomenon has been created so as to provide features, such as color balance, texture graininess, glossiness, or the like, which may be established, adjusted or modified based on input from the operator at attachment time or thereafter, the phenomenon editor 26 allows the operator, through the operator interface 27, to establish, adjust or modify the particular feature. The values for the parameters may be either fixed, or they may vary according to a function of a variable (illustratively, time). The operator, using the scene assembler 34, can attach phenomenon instances generated using the phenomenon editor 26 to elements of the scene as generated by the entity geometrical representation generator 23.

Although the phenomenon editor 26 has been described as retrieving phenomena from the phenomenon database 25 which have been generated by the phenomenon creator 24 of the scene structure generation portion 20 of computer graphics system 10, it will be appreciated that one or more, and perhaps all, of the phenomena provided in the computer graphics system 10 may be predefined and created by other devices (not shown) and stored in the phenomenon database 25 for use by the phenomenon editor 26. In such a case, the operator, controlling the phenomenon editor through the operator interface 27, can select appropriate predefined phenomena for attachment to the scene.

The scene image generation portion 21 includes several components including an image generator 30 and an operator interface 31. If the scene image generation portion 21 forms part of the same computer as the scene structure generation portion 20, the operator interface 31 may, but need not, comprise the same components as operator interface 27. On the other hand, if the scene image generation portion 21 forms part of a different computer from the computer of which the scene structure generation portion, the operator interface 31 will generally comprise different components as operator interface 27, although the components of the two operator interfaces 31 and 27 may be similar. The image generator 30, under control of the operator interface 31, retrieves the representation of the scene to be rendered from the scene representation database 22 and generates a rendered image for display on the video display unit of the operator interface 31.

Before proceeding further, it would be helpful to further describe a "phenomenon" used in connection with the invention. A phenomenon provides information that, in addition to the mathematical representation generated by the entity geometrical representation generator 23, is used to complete the definition of the scene which will be used in rendering, including, but not limited to, characteristics of the colors, textures, and closed volumes, and so forth, of the surfaces of the geometrical entities defined by the scene structure generation portion 20. A phenomenon comprises one or more nodes interconnected in the form of a directed acyclic graph ("DAG") or a plurality of cooperating DAGs. One of the nodes is a primary root node which is used to attach the phenomenon to an entity in a scene, or, more specifically, to a mathematical representation of the entity. Other types of nodes which can be used in a phenomenon comprise optional root nodes and shader nodes. The shader nodes can comprise any of a plurality of conventional shaders, including conventional simple shaders, as well as texture shaders, material shaders, volume shaders, environmental shaders, shadow shaders, and displacement shaders, and material shaders which can be used in connection with generating a representation to be rendered. In addition, a number of other types of shader nodes can be used in a phenomenon, including (i) Geometry shaders, which can be used to add geometric objects to the scene. Geometry shaders essentially comprise pre-defined static or procedural mathematical representations of entities in three-dimensional space, similar to representations that are generated by the entity geometrical representation generator 23 in connection with in connection with entities in the scene, except that they can be provided at pre-processing time to, for example, define respective regions in which other shaders used in the respective phenomenon are to be delimited. A geometry shader essentially has access to the scene construction elements of the entity geometrical representation generator 23 so that it can alter the scene representation as stored in the scene object database to, for example, modify or create new geometric elements of the scene in either a static or a procedural manner. It should be noted that a Phenomenon that consists entirely of a geometry shader DAG or of a set of cooperating geometry shader DAGs can be used to represent objects in a scene in a procedural manner. This is in contrast to typical modeling, which is accomplished in a modeling system by a human operator by performing a sequence of modeling operations to obtain the desired representation of an object in the computer. Hence, in the essence, a geometry phenomenon represents an encapsulated and automated, parameterized abstract modeling operation. An instance of a geometry phenomenon (that is, a geometry phenomenon associated with a set of parameter values which are either fixed or which vary in a predetermined manner with time or the like) will result in a specific geometric scene extension when it is evaluated by the scene image generator 30 at runtime during a pre-processing phase.

(ii) Photon shaders, which can be used to control the paths of photons in the scene and the characteristics of interaction of photons with surfaces of objects in the scene, such as absorption, reflection and the like. Photon shaders facilitate the physically correct simulation of global illumination and caustics in connection with rendering. In one embodiment, photon shaders are used during rendering by the scene image generator 30 during a pre-processing operation.

(iii) Photon volume shaders, which are similar to photon shaders, except that they operate in connection with a three-dimensional volume of space in the scene instead of on the surface of an object. This allows simulation of caustics and global illumination to be extended to volumes and accompanying enclosed participating media, such as scattering of photons by dust or fog particles in the air, by water vapor such as in clouds, or the like.

(iv) Photon emitter shaders, which are also similar to photon shaders, except that they are related to light sources and hence to emission of photons. The simulated photons for which emission is simulated in connection with photon emitter shaders may then be processed in connection with the photon shaders, which can be used to simulate path and surface interaction characteristics of the simulated photons, and photon volume shaders which can be used to simulate path and other characteristics in three-dimensional volumes in particular along the respective paths.

(v) Contour shaders, which are used in connection with generation of contour lines during rendering. In one embodiment, there are three sub-types of contour shaders, namely, contour store shaders, contour contrast shaders and contour generation shaders. A contour store shader is used to collect contour sampling information for, for example, a surface. A contour contrast shader is used to compare two sets of the sampling information which is collected by use of a contour store shader. Finally, a contour generation shader is used to generation contour dot information for storage in a buffer, which is then used by an output shader (described below) in generating contour lines.

(vi) Output shaders, which are used to process information in buffers generated by the scene image generator 30 during rendering. An output shader can access pixel information generated during rendering to, in one embodiment, perform compositing operations, complex convolutions, and contour line drawing from contour dot information generated by contour generation shaders as described above.

(vii) Three-dimensional volume shaders, which are used to control how light, other visible rays and the like pass through part or all of the empty three-dimensional space in a scene. A three-dimensional volume shader may be used for any of a number of types of volume effects, including, for example, fog, and procedural effects such as smoke, flames, fur, and particle clouds. In addition, since a three-dimensional volume shader is used in connection with light, they are also useful in connection with shadows which would arise from the procedural effects; and (viii) Light shaders, which are used to control emission characteristics of light sources, including, for example, color, direction, and attenuation characteristics which can result from properties such as the shapes of respective light sources, texture projection, shadowing and other light properties.

Other types of shaders, which may be useful in connection with definition of a scene may also be used in a phenomenon.

A phenomenon is defined by (i) a description of the phenomenon's externally-controllable parameters, (ii) one primary root node and, optionally, one or more optional root nodes, (iii) a description of the internal structure of the phenomenon, including the identification of the shaders that are to be used as nodes and how they are interconnected to form a DAG or a plurality of cooperating DAGs, and (iv) optionally, a description of dialog boxes and the like which may be defined by the phenomenon for use by the phenomenon editor 26 to allow the operator to provide values for parameters or properties that will be used in evaluation of the respective phenomenon.

In addition, a phenomenon may include external declarations and link-executable code from libraries, as is standard in programming.

As noted above, a phenomenon may include a plurality of cooperating DAGs. In such a phenomenon, during rendering, information generated from processing of one or more nodes of a first DAG in the phenomenon may be used in processing in connection with one or more nodes of a second DAG in the phenomenon. The two DAGs are, nonetheless, processed independently, and may be processed at different stages in the rendering process. The information generated by a respective node in the first DAG which may be "cooperating" with a node in the second DAG (that is, which may be used by the node in the second DAG in its processing, may be transferred from the respective node in the first DAG to the node in the second DAG over any convenient communication channel, such as a buffer which may be allocated therefor. Providing all of the DAGs which may need to cooperate in this manner in a single phenomenon ensures that all of the conditions for cooperation will be satisfied, which may not be the case if the DAGs are provided unencapsulated or separated in distinct phenomena or other entities.

As an example of a phenomenon including several cooperating DAGs, a phenomenon may include several DAGs, including a material shader DAG, an output shader DAG and instructions for generating a label frame buffer. The material shader DAG includes at least one material shader for generating a color value for a material and also stores label information about the objects which are encountered during processing of the material shader DAG in the label frame buffer which is established in connection with processing of the label frame buffer generation instructions. The output shader DAG, in turn, includes at least one output shader which retrieves the label information from the label frame buffer to facilitate performing object-specific compositing operations. In addition to the label frame buffer generation instructions, the phenomenon may also have instructions for controlling operating modes of the scene image generator 30 such that both DAGs can function and cooperate. For example, such instructions may control the minimum sample density required for the two DAGs to be evaluated.

As a second example of a phenomenon including multiple cooperating shader DAGs, a material phenomenon may represent a material that is simulated by both a photon shader DAG, which includes at least one photon shader, and a material shader DAG, which includes at least one material shader. During rendering, the photon shader DAG will be evaluated during caustics and global illumination pre-processing, and the material shader DAG will be evaluated later during rendering of an image. During processing of the photon shader DAG, information representing simulated photons will be stored in such a way that it can be used during later processing of the material shader DAG to add lighting contributions from the caustic or global illumination pre-processing stage. In one embodiment, the photon shader DAG stores the simulated photon information in a photon map, which is used by the photon shader DAG to communicate the simulated photon information to the material shader DAG.

As a third example of a phenomenon including multiple cooperating shader DAGs, a phenomenon may include a contour shader DAG, which includes at least one shader of the contour shader type, and an output shader DAG, which includes at least one output shader. The contour shader DAG is used to determine how to draw contour lines by storing "dots" of a selected color, transparency, width and other attributes. The output shader DAG is used to collect all cells created during rendering and, when the rendering is completed, join them into contour lines. The contour shader DAG includes a contour store shader, a contour contrast shader and a contour generation shader. The contour store shader is used to collect sampling information for later use by a contour contrast shader. The contour contrast shader, in turn, is used to determine whether the sampling information collected by the contour store shader is such that a contour dot is to be placed in the image, and, if so, the contour generation shader actually places the contour dot. This illustrative phenomenon illustrates four-stage cooperation, including (1) a first stage, in which sampling information is collected (by the contour store shader);

(2) a second stage, in which the decision as to whether a contour cell is to be placed (by the contour contrast shader);

(3) a third stage, in which the contour dot is created (by the contour generation shader); and (4) a fourth stage, in which created contour dots are created (by the output shader DAG).

None of the shaders in any stage makes use of another shader in another stage, but instead are processed and evaluated individually at different times, but they cooperate to enable the generation of the final result.

As a fourth example of a phenomenon including multiple cooperating shader DAGs, a phenomenon may include a volume shader DAG and a geometry shader DAG. The volume shader DAG includes at least one volume shader that defines properties of a bounded volume, for example a fur shader that simulates fur within the bounded volume. The geometry shader DAG includes at least one geometry shader that is used to include an outer boundary surface as a new geometry into the scene before rendering begins, with appropriate material and volume shader DAGs attached to the outer boundary surface to define the calculations that are to be performed in connection with hair in connection with the original volume shader DAG. In this illustrative phenomenon, the cooperation is between the geometry shader DAG and the volume shader DAG, with the geometry shader DAG introducing a procedural geometry in which the geometry shader DAG supports the volume shader DAG. The volume shader DAG makes use of this geometry, but it would not be able to create the geometry itself since the geometry is generated using the geometry shader DAG during a pre-processing operation prior to rendering, whereas the volume shader DAG is used during rendering. The cooperation illustrated in connection with this fourth illustrative example differs from that illustrated in connection with the first through third illustrative examples since the shader or shaders comprising the geometry shader procedurally provide elements that are used by the volume shader DAG, and do not just store data, as is the case in connection with the cooperation in connection with the first through third illustrative examples.

All of these examples illustrate computer graphic effects in which an image of a scene can be rendered using multiple cooperating but independent shader DAGs which are bundled and encapsulated into a single phenomenon.

Figure 3:
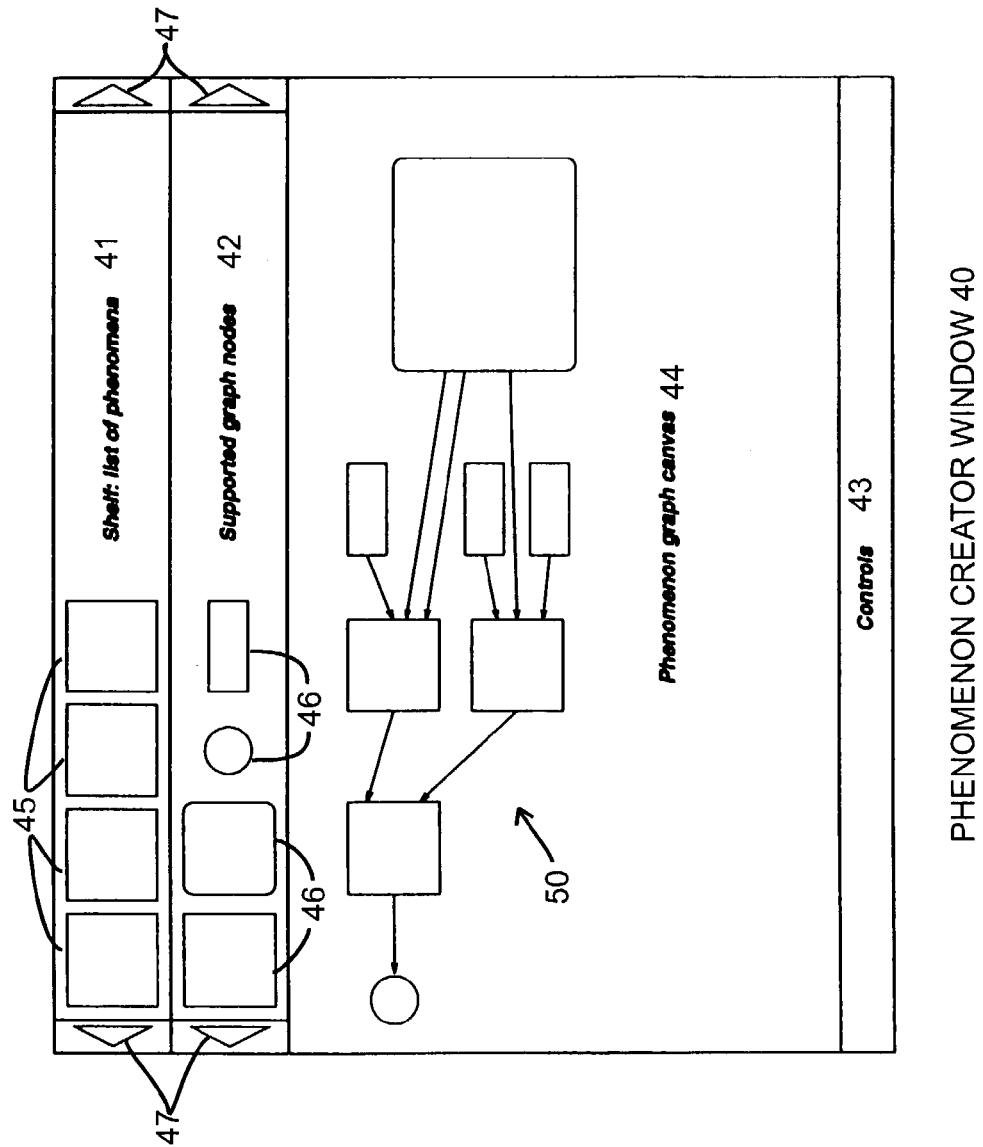
FIG. 3 depicts a graphical user interface for one embodiment of the phenomenon creator used in the computer graphics system whose functional block diagram is depicted in FIG. 2.

With this background, the operations performed in connection with the phenomenon creator 24 and phenomenon editor 26 will be described in connection with FIGS. 3 and 5, respectively. In addition, an illustrative phenomenon created in connection with the phenomenon creator 24 will be described in connection with FIG. 4, and details of the operations performed by the phenomenon editor 26 in connection with the phenomenon depicted in connection with FIG. 4 will be described in connection with FIGS. 6A and 6B. FIG. 3 depicts a phenomenon creator window 40, which the phenomenon creator 24 enables the operator interface 27 to display to the operator, to enable the operator to define a new phenomenon and modify the definition of an existing phenomenon. The phenomenon creator window 40 includes a plurality of frames, including a shelf frame 41, a supported graph node frame 42, a controls frame 43 and a phenomenon graph canvas frame 44. The shelf frame 41 can include one or more phenomenon icons, generally identified by reference numeral 45, each of which represents a phenomenon which has been at least partially defined for use in the scene structure generation portion 20. The supported graph node frame 42 includes one or more icons, generally identified by reference numeral 46, which represent entities, such as interfaces, the various types of shaders which can be used in a phenomenon, and the like, which can the operator can select for use in a phenomenon. As will be described below, the icons depicted in the supported graph node frame 42 can be used by an operator to form the nodes of the directed acyclic graph defining a phenomenon to be created or modified. In one embodiment, there are a number of types of nodes, including:

(i) A primary root node, which forms the root of the directed acyclic graph and forms the connection to the scene and typically provides a color value during rendering.

(ii) Several types of optional root nodes, which may be used as anchor points in a phenomenon DAG to support the main root node (item (i) above). Illustrative types of optional root nodes include:

(a) A lens root node, which can be used to insert lens shaders or lens shader DAGs into a camera for use during rendering;

(b) A volume root node, which can be used to insert global volume (or atmosphere) shaders or shader DAGs into a camera for use during rendering;

(c) An environment root node, which can be used to insert global environment shader or shader DAGs into a camera for use during rendering;

(d) A geometry root node, which can be used to specify geometry shaders or shader DAGs that may be pre-processed during rendering to enable procedural supporting geometry or other elements of a scene to be added to the scene database;

(e) A contour store root node, which can be used to insert a contour store shader into a scene options data structure;

(f) An output root node, which can be used in connection with post processing after a rendering phase, and (g) A contour contrast root, which can be used to insert a contour contrast shader into the scene options data structure.

(iii) A shader node, which represents a shader, that is, a function written in a high-level language such as C or C++.

(iv) A light node, which is used in conjunction with a light source. A light node provides the light source with a light shader, color, intensity, origin and/or direction, and optionally, a photon emitter shader.

(v) A material node, which is used in conjunction with a surface. A material node provides a surface with a color value, and has inputs for an opaque indication, indicating whether the surface is opaque, and for material, volume, environment, shadow, displacement, photon, photon volume, and contour shaders.

(vi) A phenomenon node, which is a phenomenon instance.

(vii) A constant node, which provides a constant value, which may be an input to any of the other nodes. The constant value may be most types of data types in the programming language used for the entities, such as shaders, represented by any of the other nodes, such as scalar, vector, logical (boolean), color, transformation, and so forth; and (viii) A dialog node, which represents dialog boxes which may be displayed by the phenomenon editor 26 to the operator, and which may be used by the operator to provide input information to control the phenomenon before or during rendering. The dialog nodes may enable the phenomenon editor 26 to enable pushbuttons, sliders, wheels, and so forth, to be displayed to allow the operator to specify, for example, color and other values to be used in connection with the surface to which the phenomenon including the dialog node is connected.

As shown in FIG. 3, the shelf frame 41 and the supported graph node frame 42 both include left and right arrow icons, generally identified by reference numeral 47, which allow the icons shown in the respective frame to be shifted to the left or right (as shown in FIG. 3), to shift icons to be displayed in the phenomenon creator window 40 if there are more entities than could be displayed at one time.

The controls frame 43 contains icons (not shown) which represent buttons which the operator can use to perform control operations, including, for example, deleting or duplicating nodes in the shelf frame 41 or supported graph node frame 42, beginning construction of a new phenomenon, starting an on-line help system, exiting the phenomenon creator 24, and so forth.

The phenomenon graph canvas 44 provides an area in which a phenomenon can be created or modified by an operator. If the operator wishes to modify an existing phenomenon, he or she can, using a "drag and drop" methodology using a pointing device such as a mouse, select and drag the icon 45 from the shelf frame 41 representing the phenomenon to the phenomenon graph canvas 44. After the selected icon 45 associated with the phenomenon to be modified has been dragged to the phenomenon graph canvas 44, the operator can enable the icon 45 to be expanded to show one or more nodes, interconnected by arrows, representing the graph defining the phenomenon. A graph 50 representing an illustrative phenomenon, is depicted in FIG. 3. As shown in FIG. 3, the graph 50 includes a plurality of graph nodes, comprising circles and blocks, each of which is associated with an entity which can be used in a phenomenon, which nodes are interconnected by arrows to define the graph associated with the phenomenon.

After the graph associated with the icon 45 which has been dragged to the phenomenon graph canvas 44 has been expanded to show the graph defining the phenomenon associated with the icon 45, the operator can modify the graph defining the phenomenon. In that operation, the operator can, using a corresponding "drag and drop" methodology, select and drag icons 46 from the supported graph nodes frames 42 representing the entities to be added to the graph to the phenomenon graph canvass 44, thereby to establish a new node for the graph. After the new node has been established, the operator can interconnect it to a node in the existing graph by clicking on both nodes in an appropriate manner so as to enable an arrow to be displayed therebetween. Nodes in the graph can also be disconnected from other nodes by deleting arrows extending between the respective nodes, and deleted from the graph by appropriate actuation of a delete pushbutton in the controls frame 43.

Similarly, if the operator wishes to create a new phenomenon, he or she can, using the corresponding "drag and drop" methodology, select and drag icons 46 from the supported graph nodes frames 42 representing the entities to be added to the graph to the phenomenon graph canvas 44, thereby to establish a new node for the graph to be created. After the new node has been established in the phenomenon graph canvas 44, the operator can interconnect it to a node in the existing graph by clicking on both nodes in an appropriate manner so as to enable an arrow to be displayed therebetween. Nodes in the graph can also be disconnected from other nodes by deleting arrows extending between the respective nodes, and deleted from the graph by appropriate actuation of a delete pushbutton in the controls frame 43.

After the operator has specified the DAG or set of cooperating DAGs for the phenomenon, either for a new phenomenon or for a modified phenomenon, and before the phenomenon represented by the graph is stored in the phenomenon database 25, the phenomenon creator 24 will examine the phenomenon graph to verify that it is consistent and can be processed during rendering. In that operation, the phenomenon creator 24 will ensure that the interconnections between graph nodes do not form a cycle, thereby ensuring that the graph or graphs associated with the phenomenon form directed acyclic graphs, and that interconnections between graph nodes represent respective input and output data types which are consistent. It will be appreciated that, if the phenomenon creator 24 determines that the graph nodes do form a cycle, the phenomenon will essentially form an endless loop that generally cannot be properly processed. These operations will ensure that the phenomenon so created or modified can be processed by the scene image generation portion when an image of a scene to which the phenomenon is attached is being rendered.

After the operator has created or modified a phenomenon, it will be stored in the phenomenon database 25.

Figure 4:
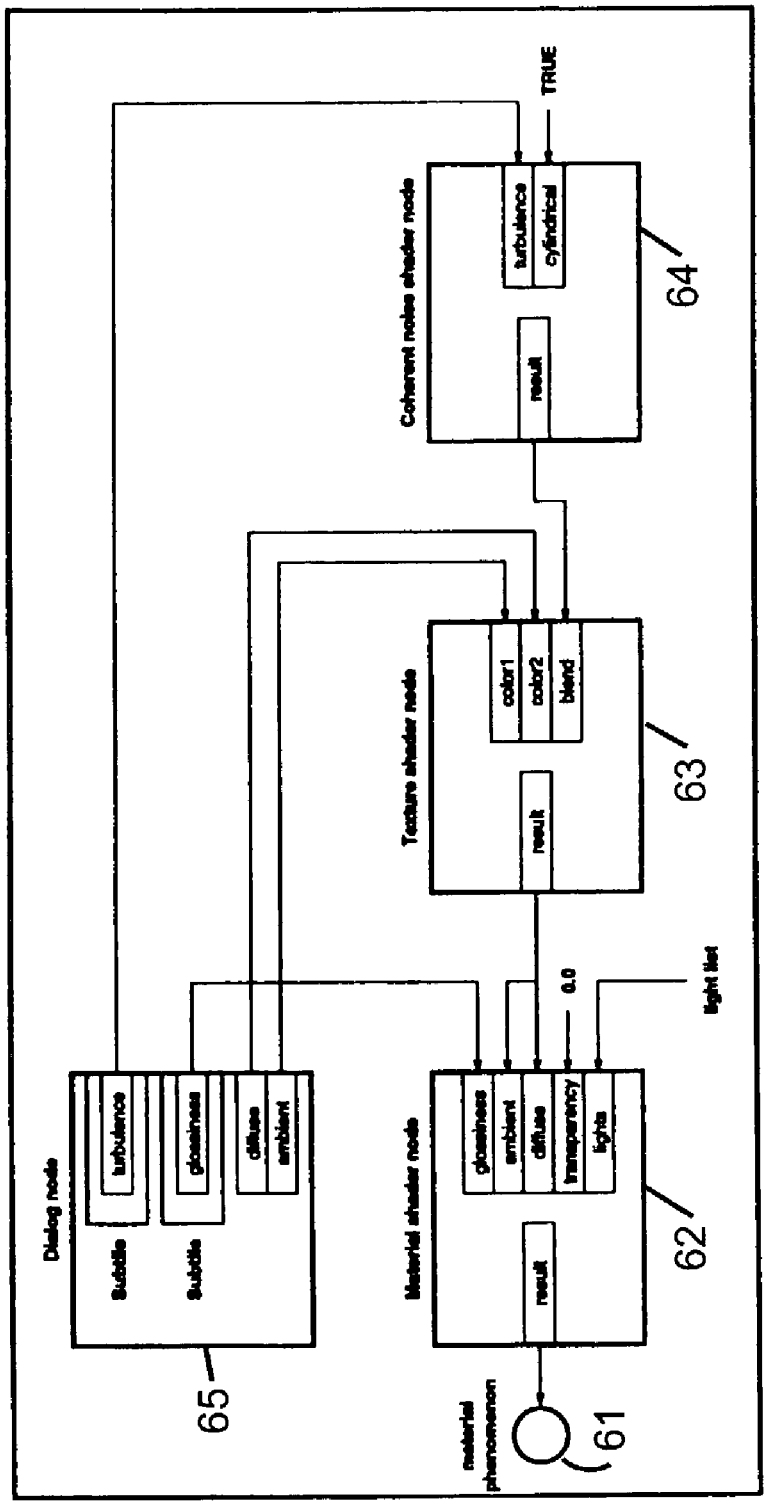
FIG. 4 graphically depicts an illustrative phenomenon generated using the phenomenon creator depicted in FIGS. 2 and 3.
Figure 5:
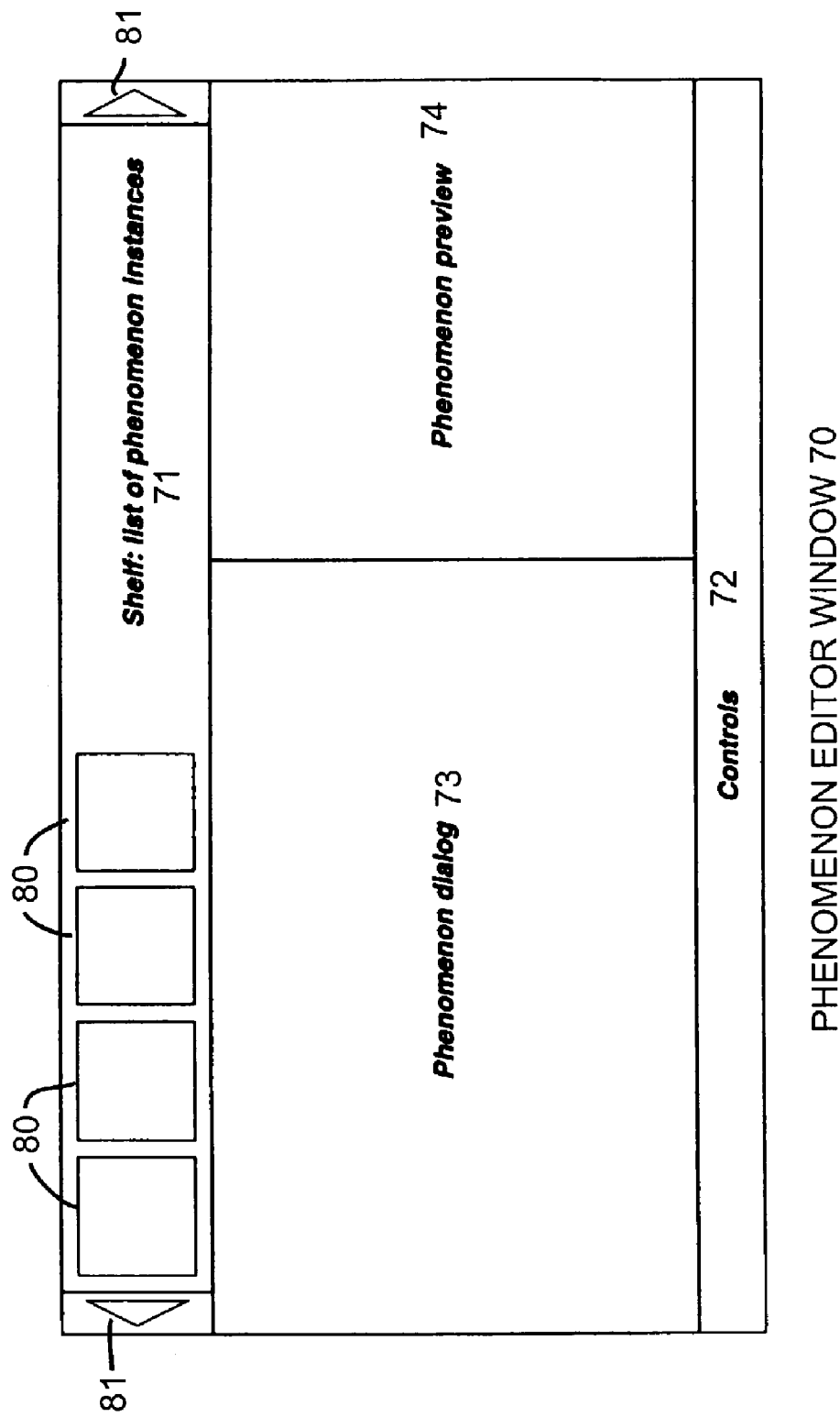
FIG. 5 depicts a graphical user interface for one embodiment of the phenomenon editor used in the computer graphics system whose functional block diagram is depicted in FIG. 2.

FIG. 4 depicts an illustrative phenomenon created in connection with the phenomenon creator 24 which can be generated using the phenomenon creator window described above in connection with FIG. 3. The illustrative phenomenon depicted in FIG. 4, which is identified by reference numeral 60, is one which may be used for surface features of a wood material. With reference to FIG. 4, the phenomenon 60 includes one root node, identified by reference numeral 61, which is used to attach the phenomenon 60 to an element of a scene. Other nodes in the graph include a material shader node 62, a texture shader node 63, a coherent noise shader node 64, which represent a material shader, a texture shader and a coherent noise shader, respectively, and a dialog node 65. The dialog node 65 represents a dialog box that is displayed by the phenomenon editor 26 to allow the operator to provide input information for use with the phenomenon when the image is rendered.

Details of a material shader, a texture shader and a coherent noise shader are known to those skilled in the art and will not be described further herein. Generally, the material shader has one or more outputs, represented by "result," which are provided to the root node 61. The material shader, in turn, has several inputs, including a "glossiness" input, an "ambient" color input, a "diffuse" color input, a "transparency" input, and a "lights" input, and the material shader node 62 represented thereby is shown as receiving inputs therefor from the dialog node 65 (in the case of the glossiness input), from the texture shader node 63 (in the case of the ambient and diffuse color inputs), from a hard-wired constant (in the case of the transparency input) and from a lights list (in the case of the lights input). The hard-wired constant value, indicated as "0.0," provided to the transparency input indicates that the material is opaque. The "glossiness" input is connected to a "glossiness" output provided by the dialog node 65, and, when the material shader represented by node 62 is processed during rendering, it will obtain the glossiness input value therefor from the dialog box represented by the dialog node, as will be described below in connection with FIGS. 6A and 6B.

The ambient and diffuse inputs of the material shader represented by node 62 are provided by the output of the texture shader, as indicated by the connection of the "result" output of node 63 to the respective inputs of node 62. When the wood material phenomenon 60 is processed during the rendering operation, and, in particular, when the material shader represented by node 62 is processed, it will enable the texture shader represented by node 63 to be processed to provide the ambient and diffuse color input values. The texture shader, in turn, has three inputs, including ambient and diffuse color inputs, represented by "color1" and "color2" inputs shown on node 63, and a "blend" input. The values for the ambient and diffuse color inputs are provided by the operator using the dialog box represented by the dialog node 65, as represented by the connections from the respective diffuse and ambient color outputs from the dialog node 65 to the texture shader node 63 in FIG. 4.

In addition, the input value for the input of the texture shader represented by node 63 is provided by the coherent noise shader represented by node 64. Thus, when the texture shader represented by node 63 is processed during the rendering operation, it will enable the coherent noise shader represented by node 64 to be processed to provide the blend input value. The coherent noise shader has two inputs, including a "turbulence" input and a "cylindrical" input. The value for the turbulence input is provided by the operator using the dialog box represented by the dialog node 65, as represented by the connections from the turbulence output from the dialog node 65 to the coherent noise shader node 64. The input value for the cylindrical input, which is shown as a logical value "TRUE," is hard-wired into the phenomenon 60.

Operations performed by the phenomenon editor 26 will be described in connection with FIG. 5. FIG. 5 depicts a phenomenon editor window 70 which the phenomenon editor 26 enables to be displayed by the operator interface 27 for use by an operator in one embodiment of the invention to establish and adjust input values for phenomena which have been attached to a scene. In particular, the operator can use the phenomenon editor window to establish values for phenomena which are provided by dialog boxes associated with dialog nodes, such as dialog node 65 (FIG. 4), established for the respective phenomena during the creation or modification as described above in connection with FIG. 3. The phenomenon editor window 70 includes a plurality of frames, including a shelf frame 71 and a controls frame 72, and also includes a phenomenon dialog window 73 and a phenomenon preview window 74. The shelf frame 71 depicts icons 80 representing the various phenomena which are available for attachment to a scene. As with the phenomenon creator window 40 (FIG. 3), the shelf frame includes left and right arrow icons, generally identified by reference numeral 81, which allow the icons shown in the respective frame to be shifted to the left or right (as shown in FIG. 3), to shift icons to be displayed in the phenomenon editor window 70 if there are more icons than could be displayed at one time.

The controls frame 73 contains icons (not shown) which represent buttons which the operator can use to perform control operations, including, for example, deleting or duplicating icons in the shelf frame 71, starting an on-line help system, exiting the phenomenon editor 26, and so forth.

The operator can select a phenomenon whose parameter values are to be established by suitable manipulation of a pointing device such as a mouse in order to create an instance of a phenomenon. (An instance of a phenomenon corresponds to a phenomenon whose parameter values have been fixed.) After the operator has selected a phenomenon, the phenomenon editor 26 will enable the operator interface 27 to display the dialog box associated with its dialog node in the phenomenon dialog window. An illustrative dialog box, used in connection with one embodiment of the wood material phenomenon 60 described above in connection with FIG. 4, will be described below in connection with FIGS. 6A and 6B. As the operator provides and adjusts the input values that can be provided through the dialog box, the phenomenon editor 26 effectively processes the phenomenon and displays the resulting output in the phenomenon preview window 74. Thus, the operator can use the phenomenon editor window 70 to view the result of the values which he or she establishes using the inputs available through the dialog box displayed in the phenomenon dialog window.

Figure 6B:
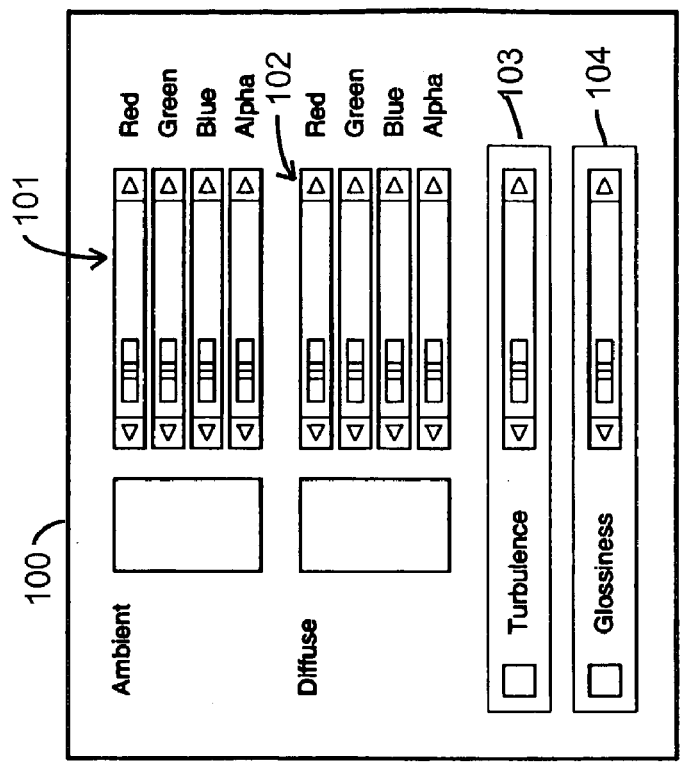
FIGS. 6A and 6B depict details of the graphical user interface depicted in FIG. 5.
Figure 6A:
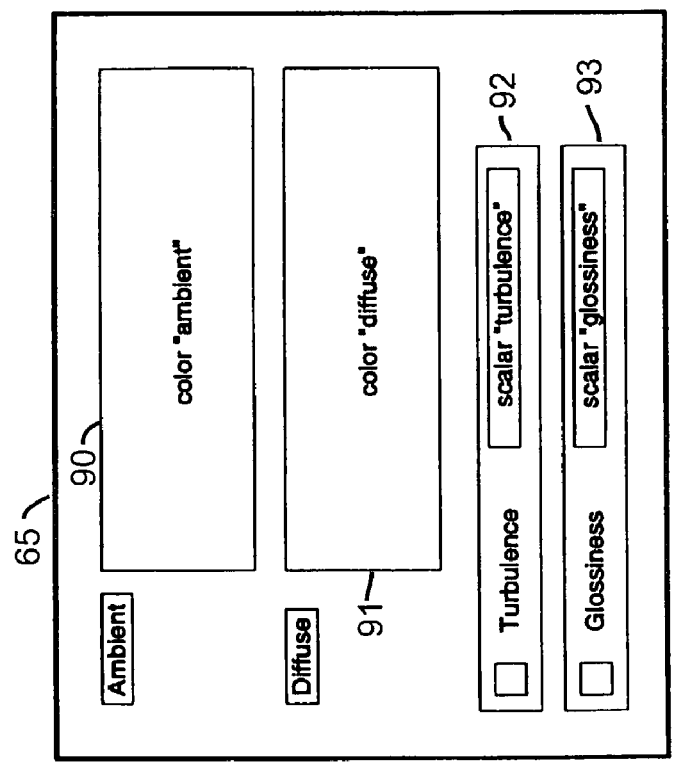

FIGS. 6A and 6B graphically depict details of a dialog node (in the case of FIG. 6A) and an illustrative associated dialog box (in the case of FIG. 6B), which are used in connection with the wood material phenomenon 60 depicted in FIG. 4. The dialog node, which is identified by reference numeral 65 in FIG. 4, is defined and created by the operator using the phenomenon creator 24 during the process of creating or modifying the particular phenomenon with which it is associated. With reference to FIG. 6A, the dialog box 65 includes a plurality of tiles, namely, an ambient color tile 90, a diffuse color tile 91, a turbulence tile 92 and a glossiness tile 93. It will be appreciated that the respective tiles 90 through 93 are associated with the respective ambient, diffuse, turbulence and glossiness output values provided by the dialog node 65 as described above in connection with FIG. 4. The ambient and diffuse color tiles are associated with color values, which can be specified using the conventional red/green/blue/alpha, or "RGBA," color/transparency specification, and, thus, each of the color tiles will actually be associated with multiple input values, one for each of the red, green and blue colors in the color representation and one for transparency (alpha). On the other hand, each of the turbulence and glossiness tiles 92 and 93 is associated with a scalar value.

FIG. 6B depicts an illustrative dialog box 100 which is associated with the dialog node 65 (FIG. 6A), as displayed by the operator interface 27 under control of the phenomenon editor 26. In the dialog box 100, the ambient and diffuse color tiles 90 and 91 of the dialog node 65 are each displayed by the operator interface 27 as respective sets of sliders, generally identified by reference numerals 101 and 102, respectively, each of which is associated with one of the colors in the color representation to be used during processing of the associated phenomenon during rendering. In addition, the turbulence and glossiness tiles 92 and 93 of the dialog node 65 are each displayed by the operator interface as individual sliders 103 and 104. The sliders in the respective sets of sliders 101 and 102 may be manipulated by the operator, using a pointing device such as a mouse, in a conventional manner thereby to enable the phenomenon editor 26 to adjust the respective combinations of colors for the respective ambient and diffuse color values provided by the dialog node 65 to the shaders associated with the other nodes of the phenomenon 60 (FIG. 4). In addition, the sliders 103 and 104 associated with the turbulence and glossiness inputs may be manipulated by the operator thereby to enable the phenomenon editor 26 to adjust the respective turbulence and glossiness values provided by the dialog node 65 to the shaders associated with the other nodes of the wood material phenomenon 60.

Figure 7:
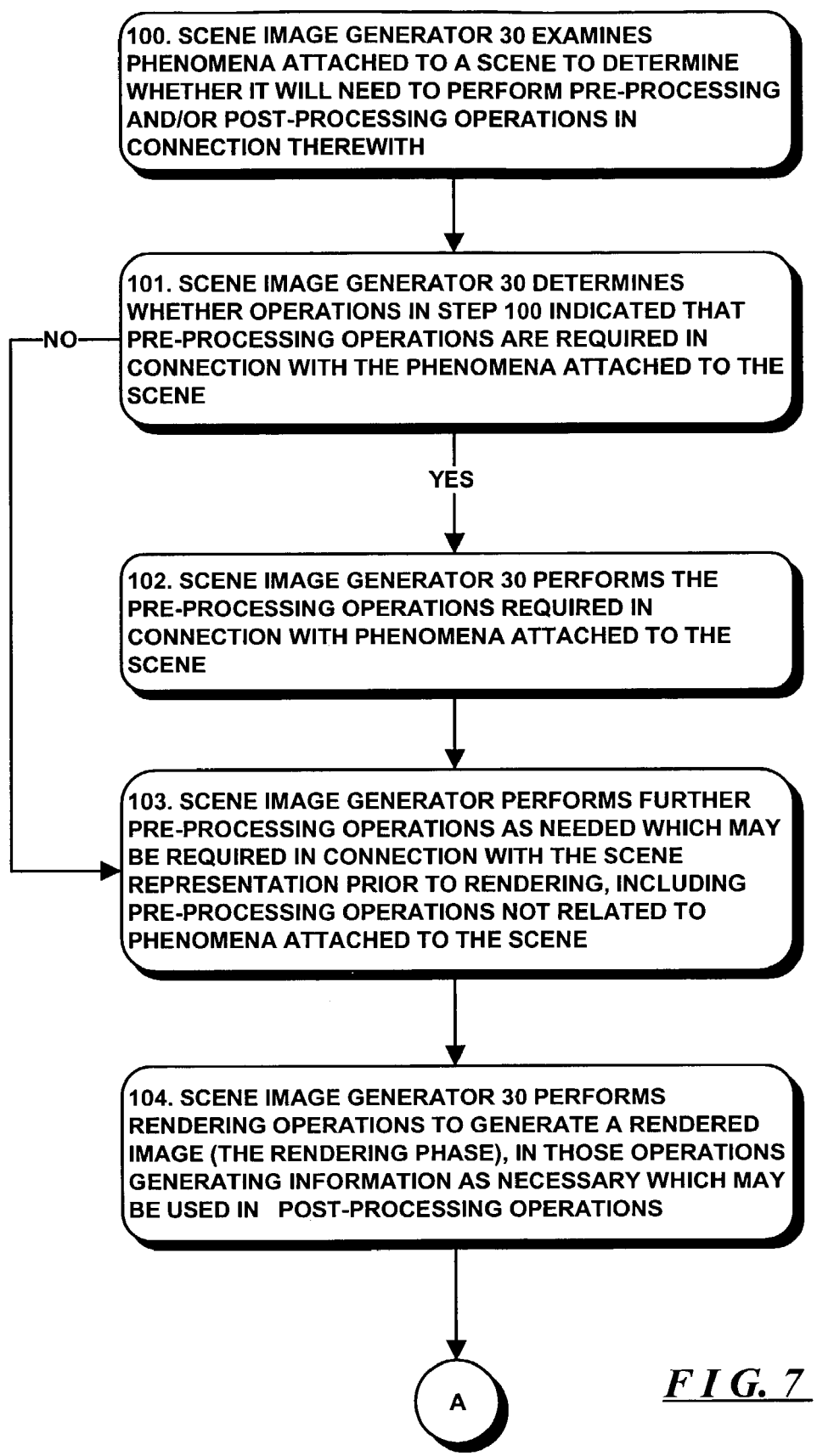
FIG. 7 is a flowchart depicting operations performed by a scene image generation portion of the computer graphics system depicted in FIG. 2 in generating an image of a scene.
Figure 7A:
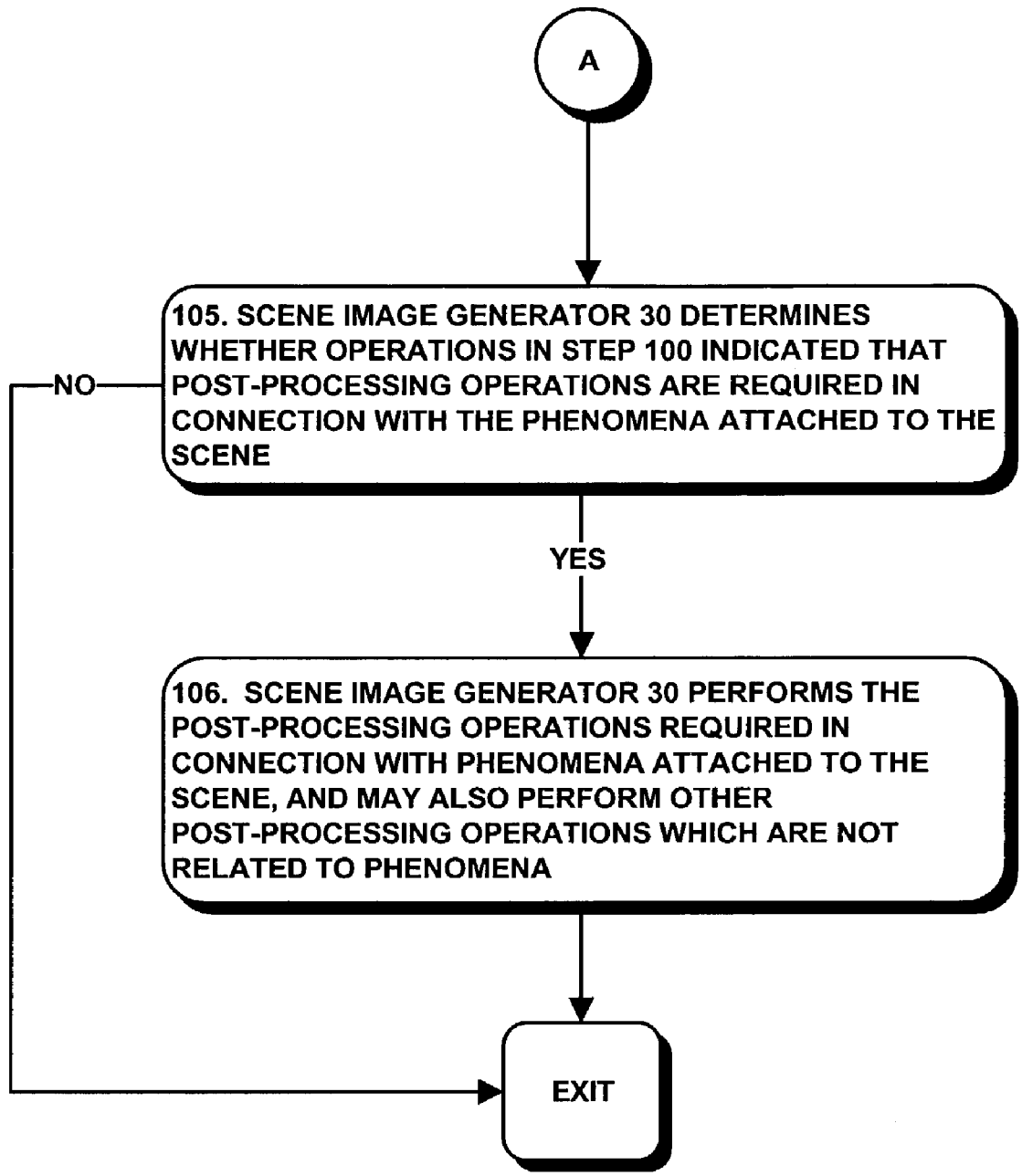

Returning to FIG. 2, after the operator, using the phenomenon editor 26, has established the values for the various phenomena and phenomena instances associated with a scene, those values are stored with the scene in the scene object database 22. Thereafter, an image of scene can be rendered by the scene image generation portion 21, in particular by the scene image generator 30 for display by the operator interface 31. Operations performed by the scene image generator 30 will generally be described in connection with the flowchart depicted in FIG. 7. With reference to FIG. 7, the scene image generator 30 operates in a series of phases, including a pre-processing phase, a rendering phase and a post-processing phase. In the pre-processing phase, the scene image generator 30 will examine the phenomena which are attached to a scene to determine whether it will need to perform pre-processing and/or post-processing operations in connection therewith (step 100). The scene image generator 30 then determines whether the operations in step 100 indicated that pre-processing operations are required in connection with at least one phenomenon attached to the scene (step 101), and, if so, will perform the pre-processing operations (step 102). Illustrative pre-processing operations include, for example, generation of geometry for the scene if a phenomenon attached to the scene includes a geometry shader, to generate geometry defined thereby for the scene. Other illustrative pre-processing operations include, for example, shadow and photon mapping, multiple inheritance resolution, and the like. Following step 102, or step 101 if the scene image generator 30 makes a negative determination in that step, the scene image generator 30 can perform further pre-processing operations which may be required in connection with the scene representation prior to rendering, which are not related to phenomena attached to the scene (step 103).

Following step 103, the scene image generator 30 will perform the rendering phase, in which it performs rendering operations in connection with the pre-processed scene representation to generate a rendered image (step 104). In that operation, the scene image generator 30 will identify the phenomena stored in the scene object database 22 which are to be attached to the various components of the scene, as generated by the entity geometric representation generator 23 and attach all primary and optional root nodes of the respective phenomena to the scene components appropriate to the type of the root node. Thereafter, the scene image generator 30 will render the image. In addition, the scene image generator 30 will generate information as necessary which may be used in post-processing operations during the post-processing phase.

Following the rendering phase (step 104), the scene image generator 30 will perform the post-processing phase. In that operation, the scene image generator 30 will determine whether operations performed in step 100 indicated that post-processing operations are required in connection with phenomena attached to the scene (step 105). If the scene image generator 30 makes a positive determination in step 105, it will perform the post-processing operations required in connection with the phenomena attached to the scene (step 106). In addition, the scene image generator 30 may also perform other post-processing operations which are not related to phenomena in step 106. The scene image generator 30 may perform post-processing operations in connection with manipulate pixel values for color correction, filtering to provide various optical effects. In addition, the scene image generator 30 may perform post-processing operations if, for example, a phenomenon attached to the scene includes an output shader that defines post-processing operations, such as depth of field or motion blur calculations that can be, in one embodiment, entirely done in an output shader, for example, dependent on the velocity and depth information stored in connection with each pixel value, in connection with the rendered image.

The invention provides a number of advantages. In particular, the invention provides an computer graphics system providing arrangements for creating (reference the phenomenon creator 24) and manipulating (reference the phenomenon editor 26) phenomena. The phenomena so created are processed by the phenomenon creator 24 to ensure that they are consistent and can be processed during rendering. Since the phenomena are created prior to being attached to a scene, it will be appreciated that they can be created by programmers or others who are expert in the development in computer programs, thereby alleviating others, such as artists, draftsmen and the like of the necessity developing them.

Also, phenomena relieve the artist from the complexity of instrumenting the scene with many different and inter-related shaders by separating it (that is, the complexity) into an independent task performed by a phenomenon creator expert user in advance. With phenomena, the instrumentation becomes largely automated. Once a phenomenon or phenomenon instance has been created, it is scene-independent and can be re-used in many scenes thus avoiding repetitive work.

It will be appreciated that a number of changes and modifications may be made to the invention. As noted above, since phenomena may be created separately from their use in connection with a scene, the phenomenon creator 24 used to create and modify phenomena, and the phenomenon editor 26 used to create phenomenon instances, may be provided in separate computer graphics systems. For example, a computer graphics system 10 which includes a phenomenon editor 26 need not include a phenomenon creator 24 if, for example, the phenomenon database 25 includes appropriate previously-created phenomena and the operator will not need to create or modify phenomena.

Furthermore, as noted above, the values of parameters of a phenomenon may be fixed, or they may vary based on a function of one or more variables. For example, if one or more values of respective parameters vary in accordance with time as a variable, the phenomenon instance can made time dependent, or "animated." This is normally discretized in time intervals that are labeled by the frame-numbers of a series of frames comprising an animation, but the time dependency may nevertheless take on the form of any phenomenon parameter valued function over the time, each of which can be tagged with an absolute time value, so that, even if an image is rendered at successive frame numbers, the shaders are not bound to discrete intervals.

In this connection, the phenomenon editor is used to select time dependent values for one or more parameters of a phenomenon, creating a time dependent "phenomenon instance." The selection of time dependent values for the parameters of a phenomenon is achieved, in one particular embodiment, by the graphically interactive attachment of what will be referred to herein as "phenomenon property control trees" to an phenomenon. A phenomenon property control tree, which may be in the form of a tree or a DAG, is attached to phenomenon parameters, effectively outside of the phenomenon, and is stored with the phenomenon in the phenomenon instance database. A phenomenon property control tree consists of one or more nodes, each of which is a shader in the sense of the functions that it provides, for example, motion curves, data look-up functions and the like. A phenomenon property control tree preferably can remain shallow, and will normally have only very few branching levels. A phenomenon property control tree can consist of only one shader, which defines a function to compute the value for the parameter associated with it at run time. A phenomenon property control tree can remain shallow because the phenomenon allows and encourages encapsulation of the complicated shader trees or DAGs, facilitating evaluation in an optimized manner during the rendering step, by for example, storing data for re-use. Allowing an operator to attach such phenomenon property control trees to control the phenomenon's parameters greatly increases the flexibility of the user to achieve custom effects based on his use of a predefined and packaged phenomenon. The number of distinct phenomenon instances that may be created this way is therefore greatly increased, while the ease of use is not compromised thanks to the encapsulation of all complexity in the phenomenon.

In addition, it will be appreciated that the appearance and structures of the windows used in connection with the phenomenon creator 24 and phenomenon editor 26, described in connection with FIGS. 3 and 5, may differ from those described herein.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

The invention claimed is:

1. A shader directed acyclic graph (DAG) for use in connection with generating an image of a scene from a representation of the scene, the shader DAG comprising a plurality of nodes, including at least one primary root node configured to facilitate attachment of the shader DAG to at least one element of the scene representation and at least one shader node connected thereto in the DAG for use in connection with rendering an image of the element in the image of the scene and at least one externally controllable parameter for controlling operations in connection with at least one of the primary root node or the at least one shader node.

2. A shader DAG as defined in claim 1, the shader DAG comprising a plurality of shader nodes connected in the DAG for use in connection with rendering an image of the element in the image of the scene.

3. A shader DAG as defined in claim 1 in which the at least one shader node is of a geometry shader node type, the at least one shader node of the geometry shader node type being configured to define geometry for the scene.

4. A shader DAG as defined in claim 1 in which the at least one shader node is of a photon shader node type, the at least one shader node of the photon shader node type being configured to control the path of at least one photon in the scene or at least one characteristic of interaction of the at least one photon with a surface of an object in the scene.

5. A shader DAG as defined in claim 1 in which the at least one shader node is of a photon emitter shader node type, the at least one shader node of the photon emitter shader node type being configured to simulate generation of at least one photon by a light source illuminating the scene.

6. A shader DAG as defined in claim 1 in which the at least one shader node is of a photon volume shader node type, the at least one shader node of the photon volume shader node type being configured to simulate interaction of at least one photon from a light source with a three-dimensional volume of space in the scene.

7. A shader DAG as defined in claim 1 in which the at least one shader node is of an output shader node type, the at least one shader node of the output shader node type being configured to perform at least one of a compositing operation, a complex convolution, or a contour line drawing operation.

8. A shader DAG as defined in claim 6, the rendered image comprising a plurality of pixels each associated with pixel information, the at lent one shader node of the output shader type being configured to perform the at least one of the compositing operation, the complex convolution, or the contour line drawing operation in connection with pixel information generated during rendering of the rendered image.

9. A shader DAG as defined in claim 1 in which the at least one shader node is of a contour store shader node type, the at least one shader node of the contour store shader node type being configured to collect contour sampling information.

10. A shader DAG as defined in claim 9 in which the at least one shader node of the contour store shader node type is configured to collect contour sampling information for a surface in the scene.

11. A shader DAG as defined in claim 9 in which the at least one shader node is of a contour contrast shader node type, the at least one shader node of the contour shader node type being configured to compare two sets of contour sampling information.

12. A shader DAG as defined in claim 9 in which the at least one shader node is of a contour generation shader node type, the at least one shader node of the contour generation shader node type being configured to generate contour dot information.

13. A shader DAG as defined in claim 1 in which the at least one shader node is of a volume shader type, the at least one shader node of the volume shader type being configured to control as least one aspect of how at least one photon passes through at least some portion of space in a scene thereby to provide an effect in the image of said portion.

14. A shader DAG as defined in claim 13 in which the at least one shader node of the volume shader type is configured to provide a visual effect in said portion.

15. A shader DAG as defined in claim 13 in which the at least one shader node of the volume shader type is configured to provide a procedural effect of said portion.

16. A shader DAG as defined in claim 1 in which the at least one shader node is of a light shader type, the at least one shader node of the light shader type being configured to control at least one emission characteristic of at least one light source illuminating the scene.

17. A shader DAG as defined in claim 16 in which said at least one emission characteristic is one of color, direction of emission of light from the light source, or an attenuation characteristic.

18. A shader DAG as defined in claim 1, the shader DAG further having at least one node of an optional root node type, the optional root node being configured to attach the shader DAG to a second element of the scene representation, the at least one optional root node being further connected to the at least one shader node in the DAG.

19. A shader DAG said 1, the shader DAG further including a second shader DAG comprising the primary root node and at least one other shader node, in which the at least one shader node of one of said DAGs is configured to provide at least one value that is used in the processing of the at least one shader node of the other of said DAGs.

20. A digital information storage device comprising a memory having a plurality of storage locations, the storage locations storing a shader directed acyclic graph (DAG) for use in connection with generating an image of a scene from a representation of the scene, the shader DAG comprising a plurality of nodes, including at least one primary root node configured to facilitate attachment of the shader DAG to an at least one element of the scene representation and at least one shader node connected thereto in the DAG for use in connection with rendering an image of the element in the image of the scene and at least one externally controllable parameter for controlling operations in connection with at least one of the primary root node or the at least one shader node.

21. A digital information storage device as defined in claim 20, the shader DAG comprising a plurality of shader nodes connected in the DAG for use in connection with rendering an image of the element in the image of the scene.

22. A digital information storage device as defined in claim 20 in which the at least one shader node is of a geometry shader node type, the at least one shader node of the geometry shader node type being configured to define geometry for the scene.

23. A digital information storage device as defined in claim 20 in which the at least one shader node is of a photon shader node type, the at least one shader node of the photon shader node type being configured to control the path of at least one photon in the scene or at least one characteristic of interaction of the at least one photon with a surface of an object in the scene.

24. A digital information storage device as defined in claim 20 in which the at least one shader node is of a photon emitter shader node type, the at least one shader node of the photon emitter shader node type being configured to simulate generation of at least one photon by a light source illuminating the scene.

25. A digital information storage device as defined in claim 20 in which the at least one shader node is of a photon volume shader node type, the at least one shader node of the photon volume shader node type being configured to simulate interaction of at least one photon from a light source with a three-dimensional volume of space in the scene.

26. A digital information storage device as defined in claim 20 in which the at least one shader node is of an output shader node type, the at least one shader node of the output shader node type being configured to perform at least one of a compositing operation, a complex convolution, or a contour line drawing operation.

27. A digital information storage device as defined in claim 25, the rendered image comprising a plurality of pixels each associated with pixel information, the at least one shader node of the output shader type being configured to perform the at least one of the compositing operation, the complex convolution, or the contour line drawing operation in connection with pixel information generated during rendering of the rendered image.

28. A digital information storage device as defined in claim 20 in which the at least one shader node is of a contour store shader node type, the at least one shader node of the contour store shader node type being configured to collect contour sampling information.

29. A digital information storage device as defined in claim 28 in which the at least one shader node of the contour store shader node type is configured to collect contour sampling information for a surface in the scene.

30. A digital information storage device as defined in claim 28 in which the at least one shader node is of a contour contrast shader node type, the at least one shader node of the contour shade node type being configured to compare two sets of contour sampling information.

31. A digital information storage device as defined in claim 28 in which the at least one shader node is of a contour generation shader node type, the at least one shader node of the contour generation shader node type being configured to generate contour dot information.

32. A digital information storage device as defined in claim 20 in which the at least one shader node is of a volume shader type, the at least one shader node of the volume shader type being configured to control at least one aspect of how at least one photon passes through at least some portion of space in a scene thereby to provide an effect in the image of said portion.

33. A digital information storage device as defined in claim 32 in which the at least one shader node of the volume shader type is configured to provide a visual effect in said portion.

34. A digital information storage device as defined in claim 32 in which the at least one shader node of the volume shader type is configured to provide a procedural effect of said portion.

35. A digital information storage device as defined in claim 20 in which the at least one shader node is of a light shader type, the at least one shader node of the light shader type being configured to control at least one emission characteristic of at least one light source illuminating the scene.

36. A digital information storage device as defined in claim 35 in which said at least one emission characteristic is one of color, direction of emission of light from the light source, or an attenuation characteristic.

37. A digital information storage device as defined in claim 20, the shader DAG further having at least one node of an optional root node type, the optional root node being configured to attach the shader DAG to a second element of the scene representation, the at least one optional root node being further connected to the at least one shader node in the DAG.

38. A digital information storage device as defined in claim 20, the shader DAG further including a second shader DAG comprising the primary root node and at least one other shader node, in which the at least one shader node of one of said DAGs is configured to provide at least one value that is used in the processing of the at least one shader node of the other of said DAGs.

* * * * *